United States Patent
Stark

(10) Patent No.: US 11,543,955 B2
(45) Date of Patent: Jan. 3, 2023

(54) SCROLLING IN FIRST AND SECOND DIRECTIONS TO SELECT FIRST AND SECOND MENU ITEMS FROM A LIST

(71) Applicant: Peratech Holdco Ltd, Richmond (GB)

(72) Inventor: Jonathan Sharif Marx Stark, Santa Ana (GB)

(73) Assignee: Peratech Holdco Ltd, Richmond (GB)

( * ) Notice: Subject to any disclaimer, the term of this patent is extended or adjusted under 35 U.S.C. 154(b) by 0 days.

(21) Appl. No.: 17/429,514

(22) PCT Filed: Feb. 25, 2020

(86) PCT No.: PCT/GB2020/000024
§ 371 (c)(1),
(2) Date: Aug. 9, 2021

(87) PCT Pub. No.: WO2020/174208
PCT Pub. Date: Sep. 3, 2020

(65) Prior Publication Data
US 2022/0121338 A1    Apr. 21, 2022

Related U.S. Application Data

(60) Provisional application No. 62/809,898, filed on Feb. 25, 2019.

(51) Int. Cl.
| G06F 3/0485 | (2022.01) |
| G06F 3/01 | (2006.01) |
| G06F 3/0482 | (2013.01) |
| G06F 3/0488 | (2022.01) |

(52) U.S. Cl.
CPC ............ G06F 3/0485 (2013.01); G06F 3/016 (2013.01); G06F 3/0482 (2013.01); G06F 3/0488 (2013.01)

(58) Field of Classification Search
CPC ...... G06F 3/0485; G06F 3/016; G06F 3/0482; G06F 3/0488; G06F 3/0487; G06F 2203/04105
See application file for complete search history.

(56) References Cited

U.S. PATENT DOCUMENTS

| 10,747,417 | B2 * | 8/2020 | Miyazaki | G06F 3/04812 |
| 2010/0229125 | A1 * | 9/2010 | Cha | H04N 21/44218 |
| | | | | 715/863 |
| 2011/0154263 | A1 * | 6/2011 | Roulliere | G06F 3/0485 |
| | | | | 715/830 |
| 2012/0147058 | A1 * | 6/2012 | Torigoe | G06F 3/0485 |
| | | | | 345/684 |
| 2015/0067557 | A1 * | 3/2015 | Lee | G06F 3/0482 |
| | | | | 715/765 |

(Continued)

FOREIGN PATENT DOCUMENTS

| EP | 3309656 A1 | 4/2018 |
| WO | 2015/073206 A1 | 5/2015 |

*Primary Examiner* — Darlene M Ritchie
(74) *Attorney, Agent, or Firm* — Richard M. Goldberg

(57) ABSTRACT

A method of selecting an entity from a list of entities, includes providing a manually applied pressure to a touch-sensitive device and activating a range of entities in response to the manually applied pressure. The range of entities includes first and second lists of entities. Scrolling in a first direction enables selection of an entity from the first list of entities and scrolling in a second direction enables selection of an entity from the second list of entities.

10 Claims, 9 Drawing Sheets

(56) References Cited

U.S. PATENT DOCUMENTS

| | | | | |
|---|---|---|---|---|
| 2015/0234529 A1* | 8/2015 | Kim | .................. | G06F 3/0485 |
| | | | | 345/173 |
| 2018/0107276 A1* | 4/2018 | Heubel | ............... | G06F 3/04883 |
| 2018/0356965 A1* | 12/2018 | Hagiwara | ............ | G06F 3/04845 |
| 2019/0079584 A1* | 3/2019 | Bonanno | ............. | G06F 3/03543 |

* cited by examiner ical phrases
SCROLLING IN FIRST AND SECOND DIRECTIONS TO SELECT FIRST AND SECOND MENU ITEMS FROM A LIST

CROSS REFERENCE TO RELATED APPLICATIONS

This application claims priority from U.S. Provisional Patent Application No. 62/809,898, filed on 25 Feb. 2019, the whole contents of which are incorporated herein by reference.

BACKGROUND OF THE INVENTION

The present invention relates to a method of selecting an entity from a list of entities and an apparatus for allowing a user to make a manual interaction.

Electronic devices incorporating touch screens are becoming increasingly common, in particular in the field of mobile telephony. Conventional mobile telephones, often referred to as smart phones, comprise touch screens in which users can provide inputs by pressing onto the device's touch screen to affect a desired output.

In many cases, activation by application of a pressure requires a user to move their finger or input device (such as a stylus) across different parts of the screen to select different elements. This is particularly true when lists of entities, such as menus having selectable items, are activated by pressing. In order to select one of the entities, a user must move their hand to enable selection. There remains a need to provide an interface in which a user can more intuitively activate entities compared to existing mechanisms.

BRIEF SUMMARY OF THE INVENTION

According to an aspect of the present invention, there is provided a method of selecting an entity from a list of entities, as claimed.

According to a second aspect of the present invention, there is provided an apparatus for allowing a user to make a manual selection, as claimed.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
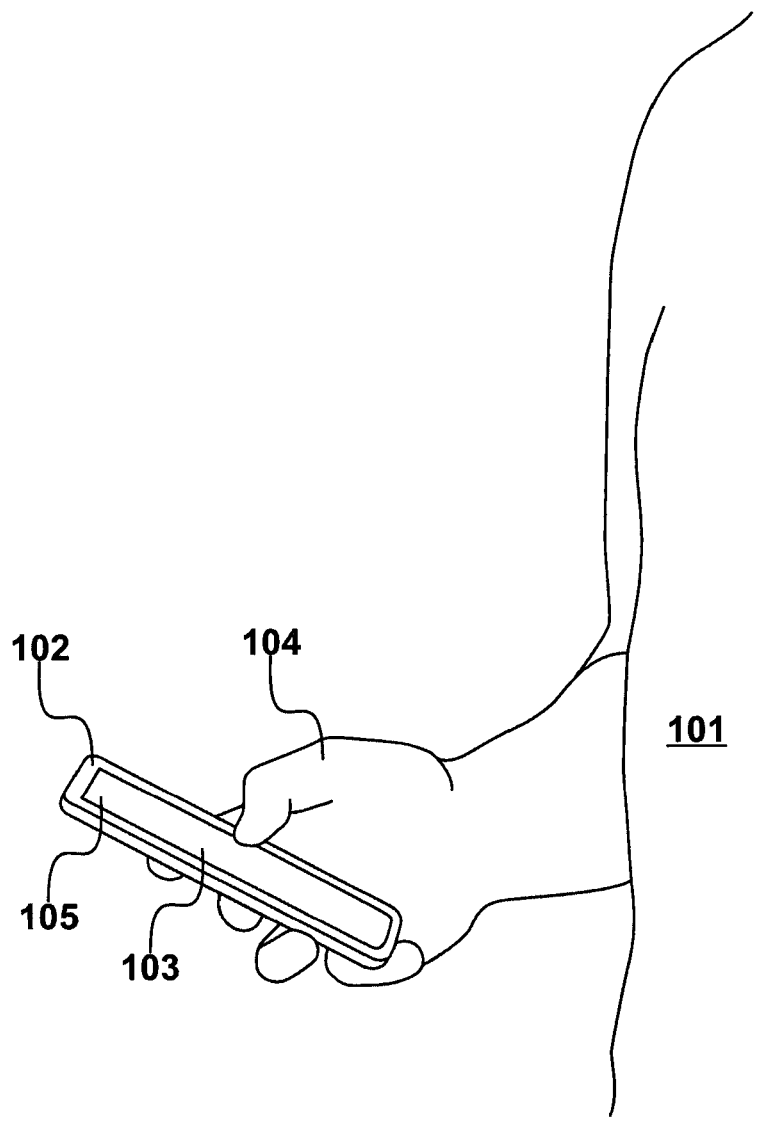
FIG. 1 shows a scenario in which a user may make a manual selection of an entity from a list of entities output to an electronic device.

A method and apparatus for allowing a user to make a manual selection of an entity from a list of entities output to an electronic device is shown in the scenario of FIG. 1. User 101 is pictured holding a typical electronic device 102 in the form of a mobile telephone. It is appreciated that, in other embodiments, the electronic device comprises any other suitable electronic device which is configured to be hand-held and operated with a single hand or thumb in the manner illustrated. Electronic device 102 comprises a touch screen 103 which is configured to receive manually applied pressure from user 101 by means of their thumb 104 and a display device 105 for displaying appropriate outputs in response to the manually applied pressure.

In an embodiment in accordance with the present invention, user 101 can therefore operate electronic device 102 by means of a single digit (i.e. thumb 104) without needing to move their hand as a whole from the hand holding position depicted in FIG. 1. In this way, in the invention described herein, the electronic device 102 can be operated by a single digit. While the embodiments described herein specifically describe the invention by utilization of a thumb, it is appreciated that any other digit or an alternative input device is also suitable for use in the process of the invention. In each case, the digit or input device however, is simply configured to not require a change from one digit or input device to another.

FIG. 2

Figure 2:
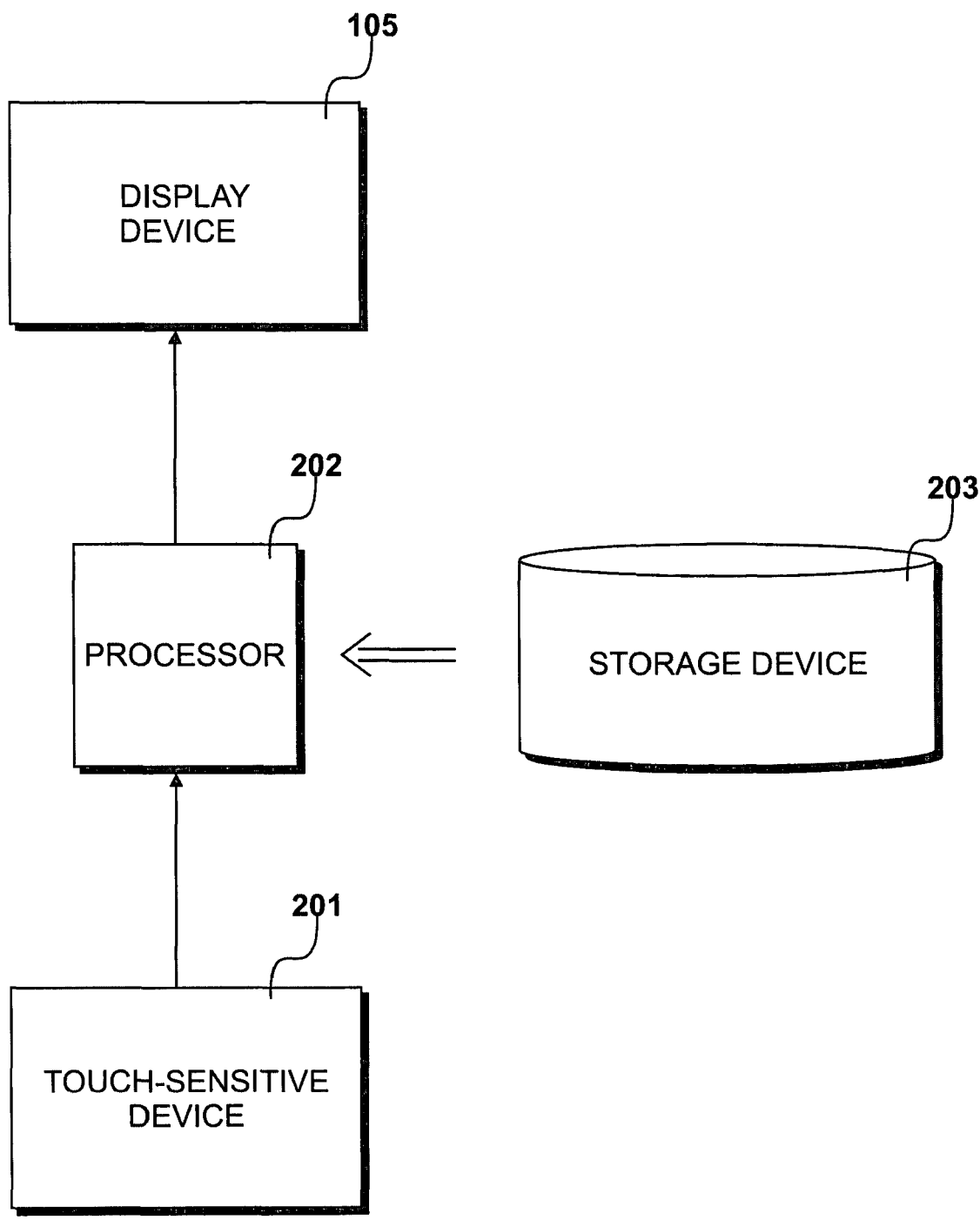
FIG. 2 shows a schematic overview of an apparatus for allowing a user to make a manual selection.

A schematic overview of an apparatus for allowing a user to make a manual selection is illustrated in FIG. 2. The apparatus of FIG. 2 forms part of the electronic device 102 previously described in FIG. 1. Display device 105 is configured to display or show a range of entities to user 101. A touch-sensitive device 201 is arranged to produce an output signal that changes by an extent related to an applied level of pressure. Processing device 202 is configured to activate the range of entities in response to the output signal from the touch-sensitive device 201 and provide a first list of entities in response to scrolling by a user in a first direction and a second list of entities in response to scrolling by a user in a second direction.

Data displayed on the display device 105 may also include visual or graphical data derived from a storage device 203.

FIG. 3

Figure 3:
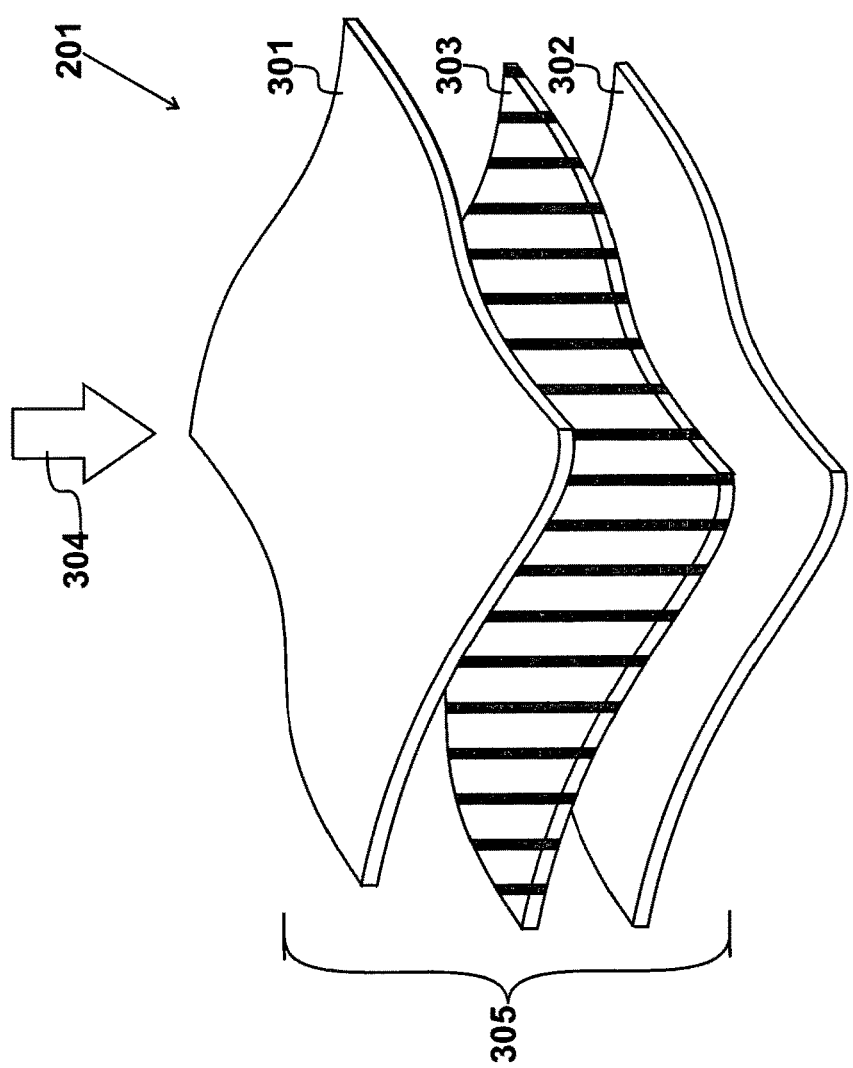
FIG. 3 shows an exploded schematic view of a touch-sensitive device.

An exploded schematic view of touch-sensitive device 201 is shown in FIG. 3. Touch-sensitive device 201, as explained previously, is arranged in an apparatus in order to produce an output signal that changes by an extent related to an applied level of pressure. Touch-sensitive device 201 comprises a force sensing device comprising a plurality of layers. A first conductive layer 301 and a second conductive layer 302 are placed in parallel and an active layer 303 is positioned between first conductive layer 301 and second conductive layer 302. This arrangement enables touch-sensitive device 201 to be responsive to applied pressures of varying intensity, although it is appreciated that alterative arrangements may perform the same functions.

In the embodiment, first conductive layer 301 comprises a plurality of conductive traces which form a plurality of rows across the layer in a first direction. In contrast, second conductive layer 302 comprises a further plurality of conductive traces which form a plurality of columns across the layer of the array in a second direction. In the embodiment, the first and second directions are orientated at ninety degrees (90°) to each other to form a sensing array.

Active layer 303, positioned between first conductive layer 301 and second conductive layer 302 comprises a pressure sensitive material, which, in the embodiment, comprises a quantum tunneling material. A quantum tunneling material of this type is configured to exhibit a change in electrical resistance based on a change in applied pressure or force. The quantum tunneling material may comprise a printable ink or film and is available from the present applicant, Peratech Holdco Limited and sold under the trade mark QTC®.

In the embodiment, the first conductive layer 301 and conductive layer 302 are overlaid with active layer 303 therebetween. Thus, when overlaid in this way, the intersections between the plurality of rows of the first conductive layer and the plurality of columns of the second conductive layer can be used to calculate the position of an applied pressure, as illustrated by arrow 304, while the active layer is configured to provide an extent property or intensity of a pressure applied in a conventional manner by interpretation of the electrical outputs.

It is appreciated that, in this illustrated embodiment, touch-sensitive device 201 is shown in exploded view, however, it is appreciated that the touch-sensitive device has a relatively small thickness 305—under around fifty micrometers (50 μm) in total—thereby enabling the touch-sensitive device 201 to be incorporated into a touch screen of an electronic device to provide positional properties identifying the location of a pressure input in response to an applied level of pressure and further configured to provide extent properties identifying the magnitude of pressure applied.

It is further appreciated that the touch-sensitive device 201 of FIG. 3 provides an example of a touch-sensitive device, and that other alternatives which are able to provide an indication of the location of pressure input and the magnitude of pressure applied may also be utilized in accordance with the present invention.

FIG. 4

Figure 4:
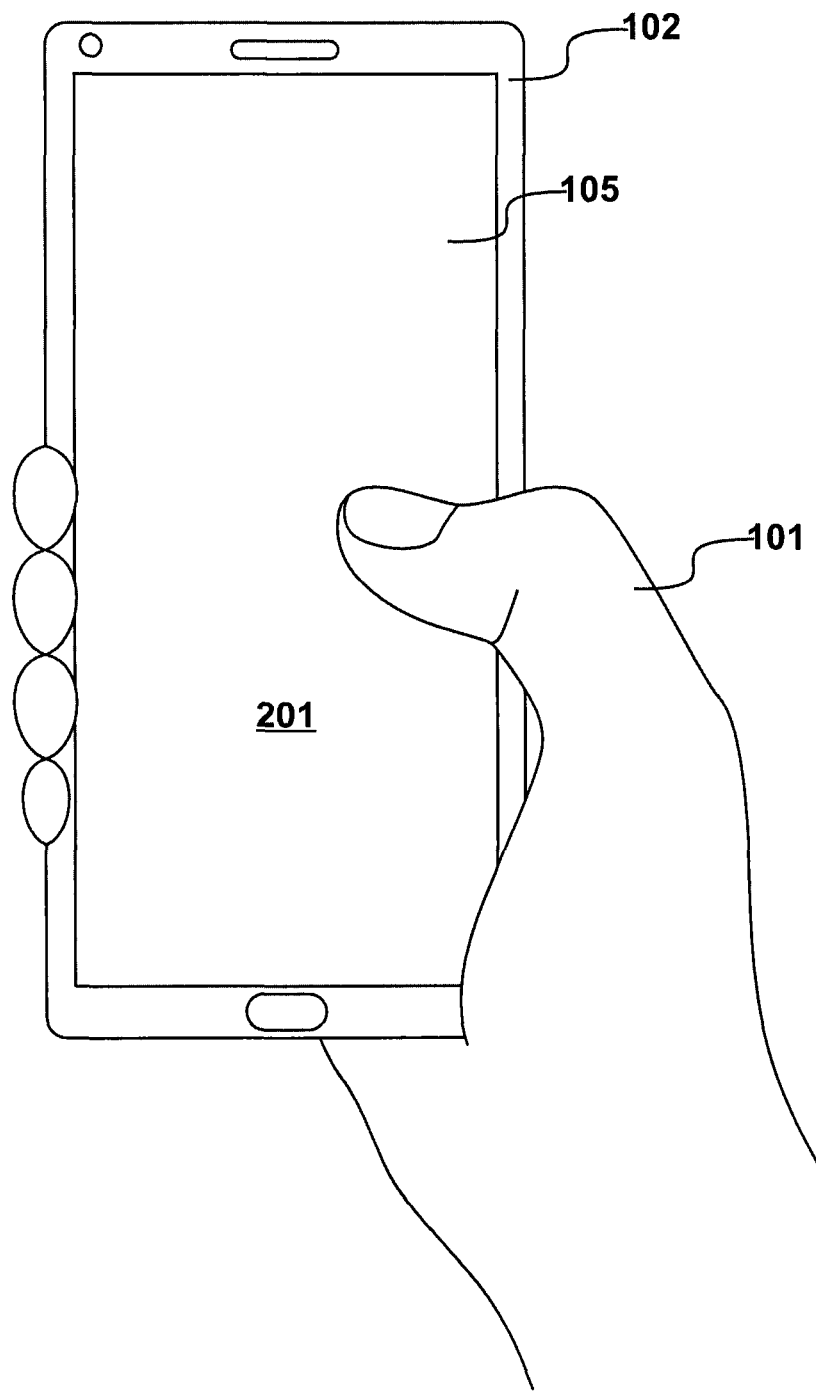
FIG. 4 shows a user holding an electronic device comprising a touch screen which can be utilized by means of a one-handed finger scroll.

An alternative view of the electronic device 102 is shown in FIG. 4, in which user 101 is shown in position to provide an input by means of thumb 104 to touch sensitive device 201.

On application of a pressure, display device 105 is configured to display visual or graphical data or a list of entities in response to an input from user 101.

In the illustrated embodiment, user 101 holds the electronic device 102 in a substantially conventional manner, in which the palm of the hand supports the rear of the electronic device 102 with the user's fingers providing an appropriate grip. Thumb 104 is therefore free to provide inputs to electronic device 102 by means of touch screen and touch-sensitive device 201.

FIG. 5

The present invention provides a method in which a user can move their thumb along two scrolling axes by means of a one-handed scrolling interface thereby allowing the user to scroll their thumb only to provide different options on the touch screen.

Figure 5:
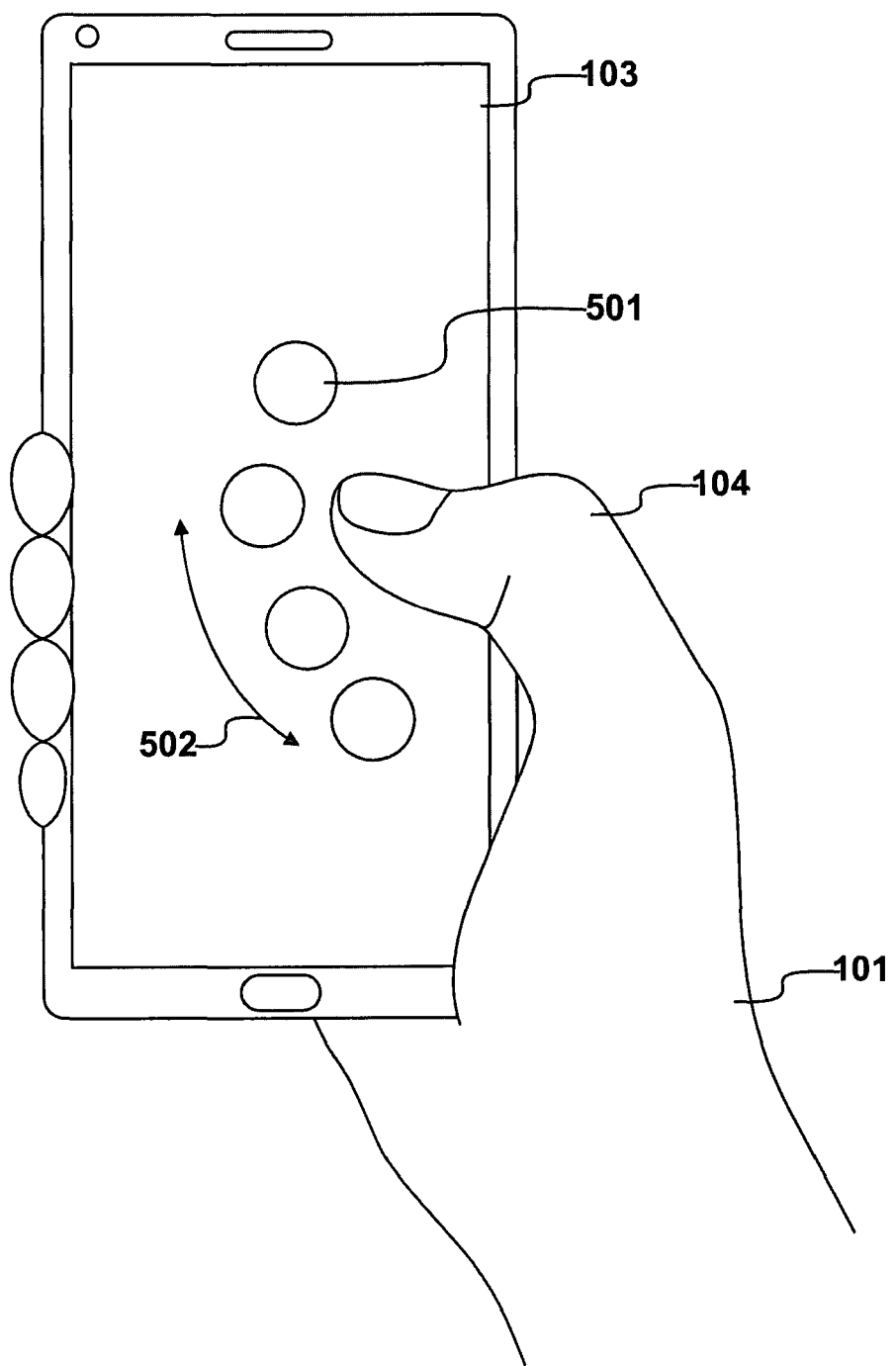
FIG. 5 shows the selection of entities from a first list of entities by means of scrolling.

In FIG. 5, a first axis allows user to scroll in a first direction, as will now be described. To initiate the process, user 101 manually applies a pressure to the touch screen 103 which activates a first list of entities 501 over a predetermined range. Each entity is representative of a different option or output to be selected by user 101. In the embodiment, a list of four entities is shown, each of which in this case being configured to activate a further second list of entities upon selection. It is appreciated that, however, in further embodiments, a larger or smaller list of entities may be output or chosen. In the embodiment, the list of entities may be activated in response to a particular gesture provided by thumb 104 or alternatively by applying a pressure to a specific area of touch screen 103. Further alternative activations are also envisaged.

In order to select one of the four entities shown, user 101 scrolls thumb 104 along a first axis identified by arrow 502. In the embodiment, user 101 can scroll through each entity by scrolling along axis 502. A scrolling action may take place in either direction along the axis, such as upwards or downwards, as represented by the arrowheads. In this way, user 101 can provide selection to any one of the entities displayed. Scrolling in either of these directions can result in the selection of an entity from the list of entities displayed.

In the embodiment, as user 101 articulates their thumb 104 each entity may exhibit a highlighted display to indicate potential selection. In one embodiment, selection of such an entity may be made by providing an instantaneous manually applied pressure once the desired entity has been highlighted. In a further embodiment, an entity may be selected by user 101 stopping movement of their thumb and desisting in scrolling. In an alternative embodiment, section may be made by providing scrolling in an alternative direction corresponding to a second list of entities as will be described further with respect to FIG. 6.

In the embodiment, selection of an entity provides a haptic response to a user and this includes a click or a vibration of the electronic device to provide an indication to the user that an entity has been selected. A visual output may also be provided.

The speed of the output of the list of entities when scrolling can be altered by the direction of scrolling applied by user 101. In the embodiment, when thumb 104 provides a manually applied pressure and scrolls upwards along axis 502 an initial speed is activated. By continuing to provide a scrolling action in this same (upwards) direction, the speed of scrolling (and therefore presentation of different entities in the list of entities) increases to provide a faster display of new entities in the list of entities. If user 104 further provides a change in direction to scroll along axis 502 in a downwards direction, the speed of scrolling is reduced so as to take account of the user missing their desired selection and ensuring highlighting of their required selection. In further embodiments, it is appreciated that the increased and reduced speeds may be oppositely presented, such that upwards direction scrolling decreases the speed, and downwards direction scrolling increases the speed of the scrolling.

Once the required selection has been highlighted, the entity may be selected as previously indicated.

FIG. 6

Figure 6:
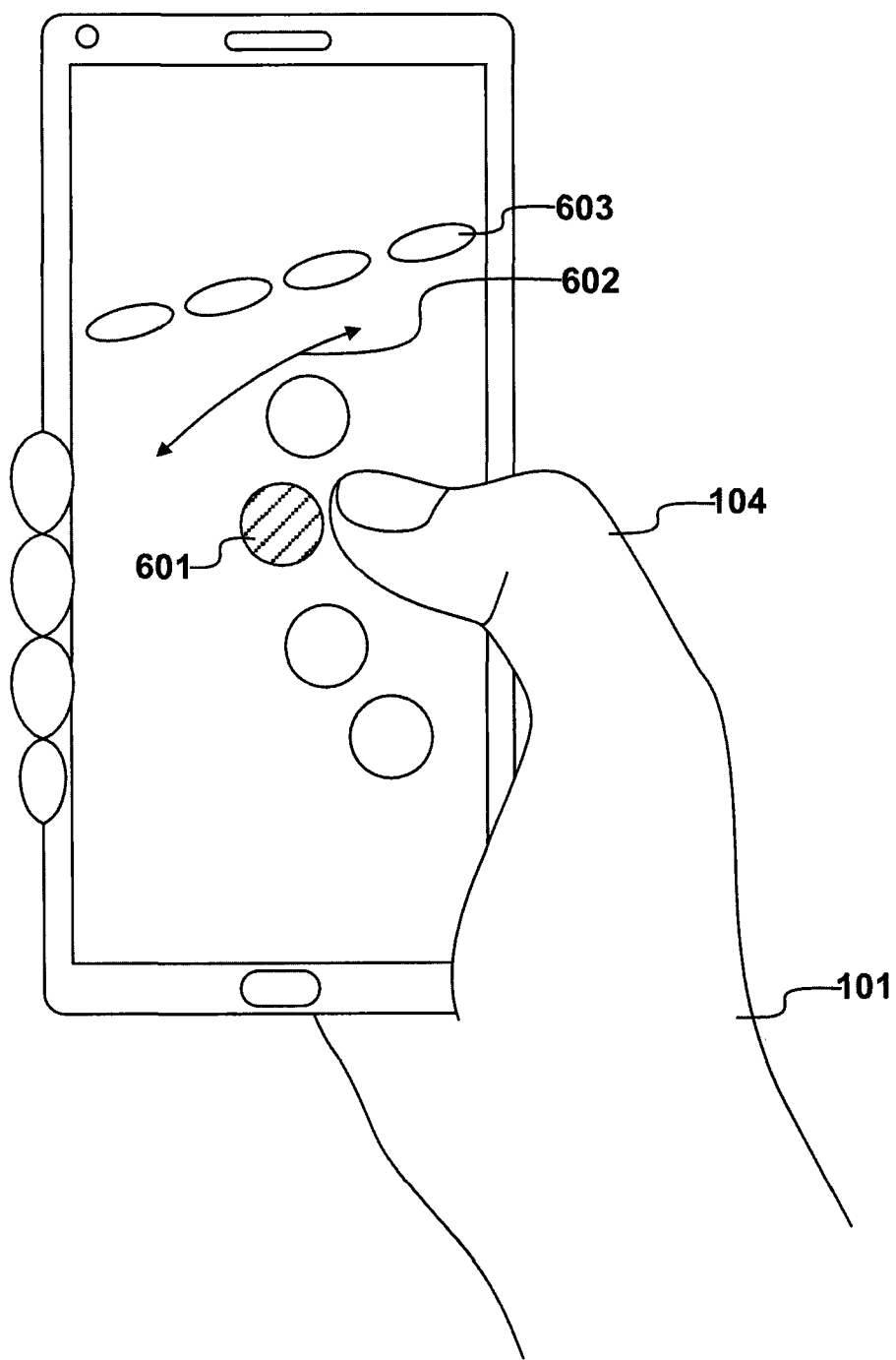
FIG. 6 shows a further selection of entities from a second list of entities following the selection from the first list of entities of FIG. 5.

In the embodiment of FIG. 6, upon highlight of entity 601 from list of entities 501, user 101 scrolls along a second axis 602 to provide a confirmatory selection of entity 601 so as to activate second list of entities 603. By moving the thumb 104 along axis 602, any one of the entities on list of entities 603 may be further highlighted by user 101. In this way, user 101 can scroll along one direction.

As with the first list of entities, the operation of the second list of entities is substantially similar. Thus, the speed of the output of the second list of entities when scrolling can be altered by the direction of scrolling applied by user 101. In the embodiment, when thumb 104 provides a manually applied pressure and scrolls in a substantially right direction along axis 602 scrolling along the entities is activated. By continuing to provide a scrolling action in this same right direction, the speed of scrolling (and therefore presentation of different entities in the list of entities) increases to provide a faster display of new entities in the list of entities. If user 104 further provides a change in direction to scroll along axis 602 in a relatively left direction, the speed of scrolling is reduced so as to take account of the user missing their desired selection and ensuring highlighting of their required selection. In further embodiments, it is appreciated that the increased and reduced speeds may be oppositely presented, such that right hand direction scrolling decreases the speed, and left-hand direction scrolling increases the speed of the scrolling.

Thus, in this way, axis 602 (and similarly axis 502) can be considered to operate between a state of zero speed in a first direction and a predetermined maximum speed in a second (opposite) direction in order to select an entity from the list of entities displayed. In one embodiment, selection of such an entity may be made by providing an instantaneous manually applied pressure once the desired entity has been highlighted. In a further embodiment, an entity may be selected by user 101 stopping movement of their thumb and desisting in scrolling.

On selection of a required entity, a haptic response is provided to a user and this includes a click or a vibration of the electronic device to provide an indication to the user that an entity has been selected. The haptic response may also vary depending on the position in the list of entities displayed, for example, the haptic response may be provided in line with each entity. A visual output may also be provided.

The arrangement provides complete control for a user over selecting items or entities from a list by means of a single digit or thumb. Thus, a user can easily select an item from the different displayed options from each list. In accordance with the invention, there is no need for additional buttons while several lists may be utilized sequentially to provide more complex choices and output from a single input point. Furthermore, options may be suitably narrowed by removing visuals of previously identified lists of entities to provide a clean visual interface appealing to the user.

FIG. 7

Figure 7:
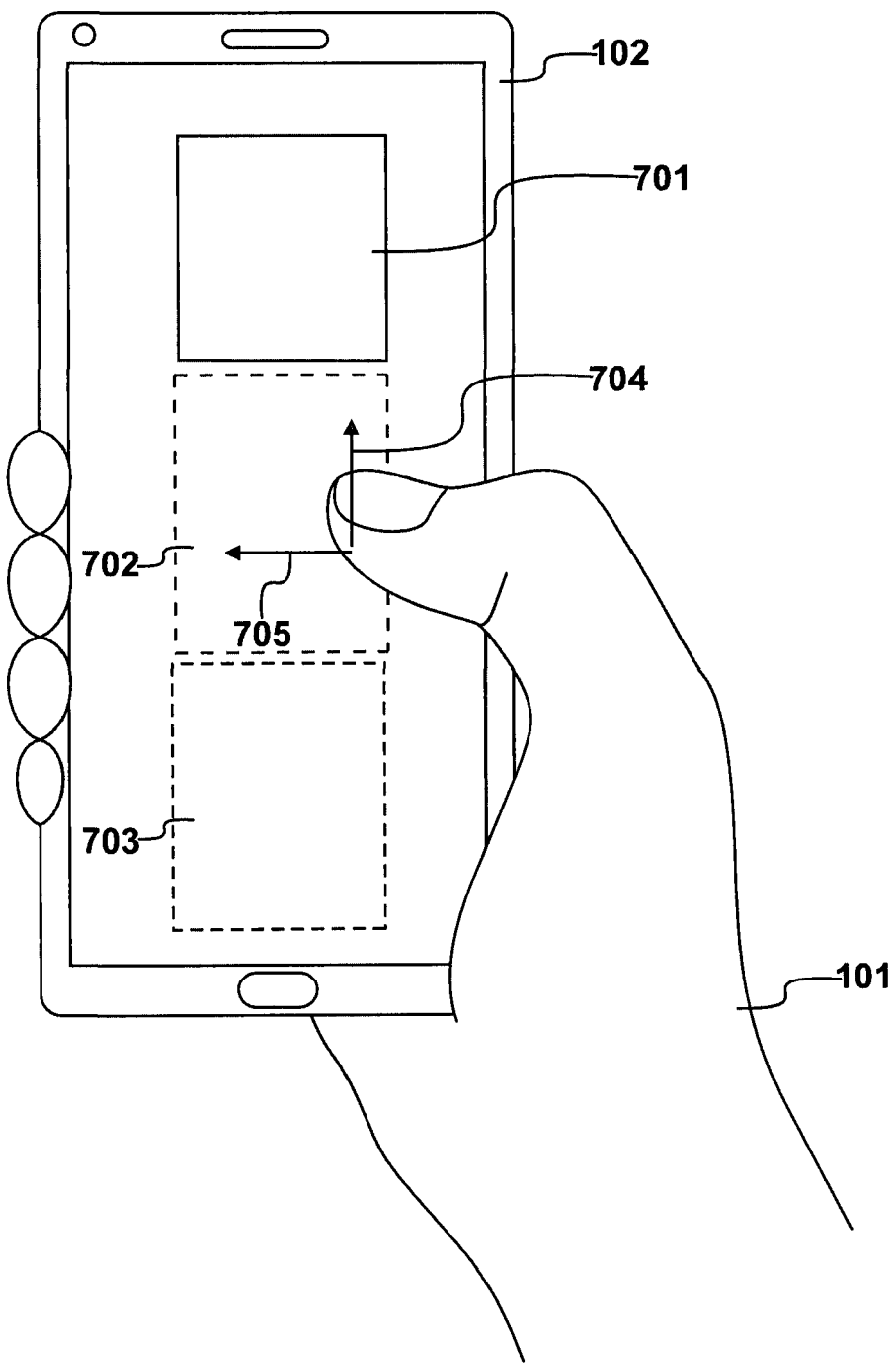
FIG. 7 shows an example of three data sets selectable from a single input point on a touch screen of an electronic device.

A further example embodiment in accordance with the present invention is shown in FIG. 7. In the embodiment, by means of a single thumb pressure applied by user 101 to electronic device 102 provides a list of entities comprising a first entity 701, a second entity 702 and a third entity 703.

In this embodiment, selection of first entity 701 is made by providing a movement in the direction of arrow 704. In this way, a single action selects entity 701. Once first entity 701 is selected, a second entity 702 is displayed for selection. In order to select an entity, user 101 can scroll in the direction of arrow 704, or alternatively reject entity 702 by scrolling in the direction of arrow 705. Once activated, the electronic device may display entity 703 and its corresponding list of further entities.

Thus, in this example, user 101 can hold electronic device 102 in their hand and select several lists of entities at once for further analysis or selection. Choices can therefore be made by a user before scrolling upwards to receive the next option or entity list. This removes the need to reach elsewhere on the touch screen to receive the next option. A reset or 'back' option may further be achieved by scrolling downwards i.e. in the opposite direction of arrow 704. This can be seen as a different gesture movement to the acceleration movements.

It is anticipated that, on receipt of an electronic device, a set-up interface may be provided to enable a user to learn any gestures or conventions of the selection system. In this way, the process can be intuitive to the user and calibration can be carried out with user-specific criteria.

FIG. 8

A further example will now be described with respect to FIGS. 8 and 9. In the embodiment, selection can be made based on an area of the touch screen. In the embodiment, electronic device 102 responds to a manually applied pressure made at point 801 on touch screen 103.

The manually applied pressure activates a range of entities comprising a first list of entities corresponding to area 802 and a second list of entities corresponding to area 803. The range of entities can be increased or decreased depending on the magnitude of the manually applied pressure. Thus, in the embodiment, in response to an increase in manually applied pressure, the range of entities increases from, for example, the list of entities identified in respect of area 802 to include the list of entities identified in respect of area 803. In response to a reduction in the magnitude of manually applied pressure, the range of entities decreases, for example from the list of entities identified in respect of areas 802 and 803 to the list of entities identified in respect of area 802 only.

In an embodiment, the entities are displayed on the display device in combination with a grid 804. In an embodiment, grid 804 comprises a map, with each grid point corresponding to a location in a particular area. In an example, if a user requires an indication of facilities in a particular area, the list of entities may correspond to the particular facilities in question. For example, if a user wishes to identify a restaurant in a suitable area, they may be presented with a suitable list of restaurants in response to the amount of pressure applied corresponding to the area in which they may be willing to travel. The lists provided can then be narrowed down by the methods described herein.

In the embodiment, the speed on which the range of entities increases is dependent on the manually applied pressure. In particular, an increase in pressure results in an increase in the speed in which the range of entities increases, and a decrease in pressure results in a decrease in the speed or a reduction in the number of the range of entities on display.

In addition, if user 101 removes their thumb, digit or other input device, the change in range of entities will reduce. This is due to hysteresis which is present in the touch-sensitive device and the pressure sensitive material of the touch-sensitive device. In an embodiment, the touch-sensitive device can be programmed or customized electronically to match the need. In this way, the hysteresis, which is inherent in the system, can be manipulated to be useful in the output of the system. Thus, the speed at which a user removes their finger, thumb or similar is progressive. This provides a tactile operation from the touch-sensitive device.

FIG. 9

Figure 8:
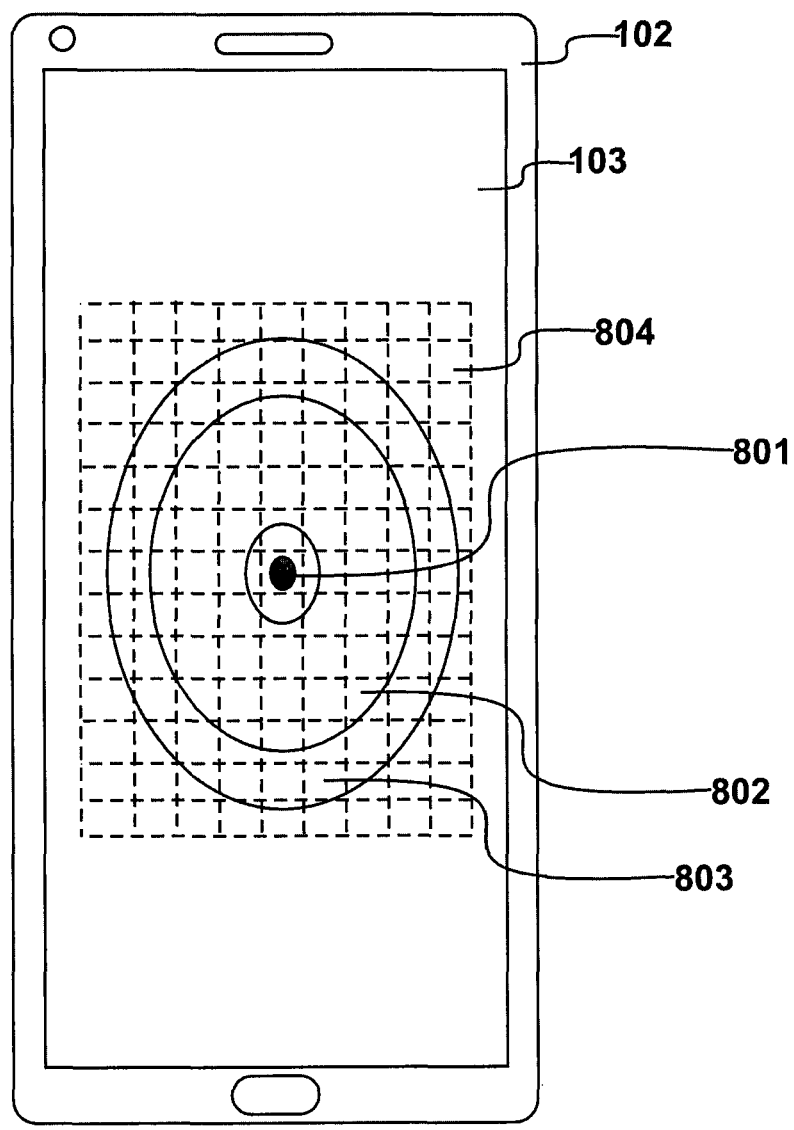
FIG. 8 shows a further embodiment in which a range of entities is increased to allow for a selection of a further entity.
Figure 9:
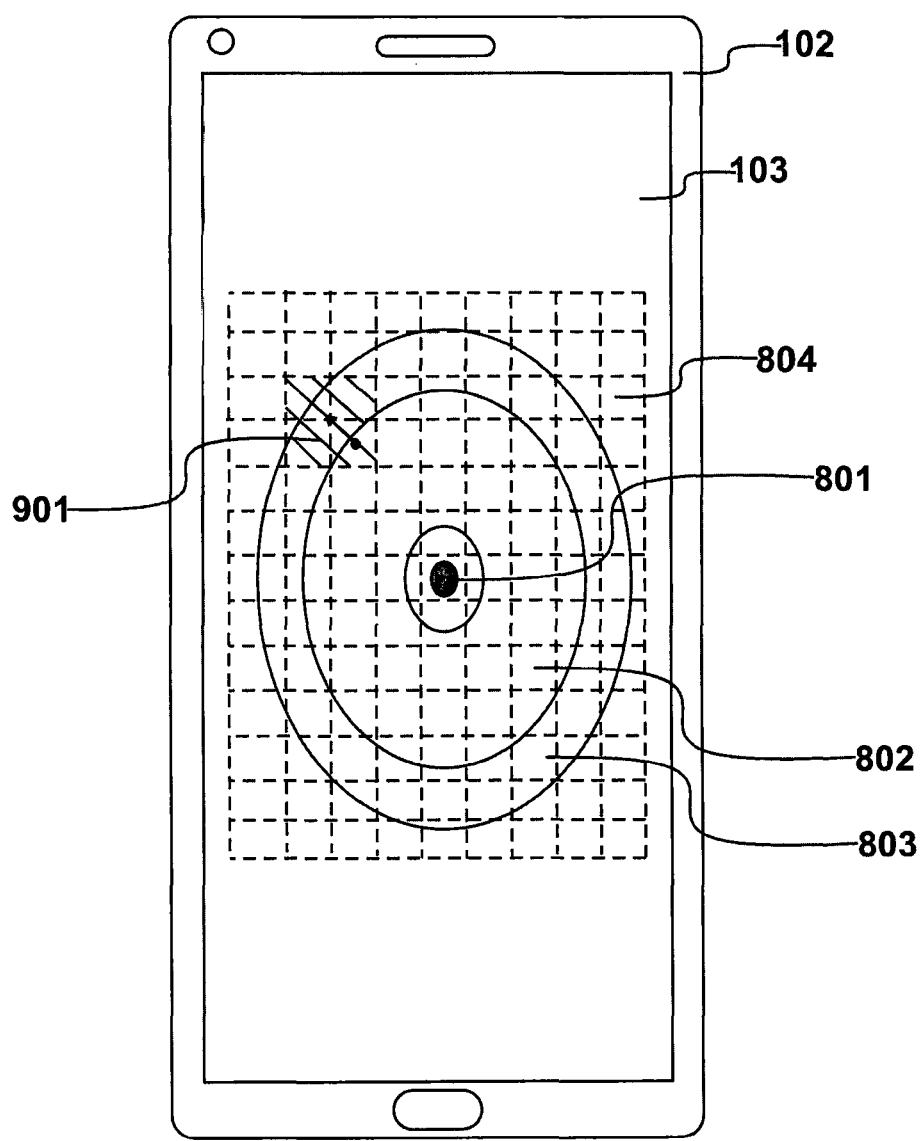
FIG. 9 shows the embodiment of FIG. 8 and selection of the further entity.

To enable selection of an entity in the embodiment of FIG. 8, scrolling of the thumb or other digit of a user can be utilized from point 801 to provide a selection within the range of entities highlighted within areas 802 and 803 as required. In response to a list of entities presented to user 101, a desired range of entities 901, corresponding to a particular area in grid 804 can be highlighted in a similar manner to the embodiments described in FIGS. 5 and 6.

Thus, in the example described previously, a user can make a selection of a particular area of restaurants or other data based on their inputs from a single digit. Thus, while the presentation and display differs from the previous embodiments, this example allows a user to provide a single press from one hand in order to provide selection of a single entity from a plurality of entities as presented in a list or menu format.

The invention claimed is:
1. A method of selecting an item from a list of items, comprising the steps of:
   providing a manually applied pressure to a touch-sensitive device; and
   activating a list of items in response to said manually applied pressure, said list of items comprising a first list of items and a second list of items;
   scrolling in a first direction along a first scrolling axis to select an item from said first list of items; and
   scrolling in a second direction along a second scrolling axis to select an item from said second list of items; wherein:
   said step of scrolling in a first direction is reduced in speed by scrolling in a third direction, said third direction being substantially opposite to said first direction along said first scrolling axis; and
   the number of items in said list of items increases in response to an increase in said manually applied pressure.

2. The method of claim 1, wherein said step of selecting an item includes a haptic response upon selection of said item.

3. The method of claim 1, wherein said step of scrolling in a first direction is increased in speed by further scrolling in said first direction.

4. The method of claim 1, wherein the number of items reduces in response to a reduction in said manually applied pressure.

5. The method of claim 1, further comprising the steps of:
   applying said manually applied pressure at a location on said touch sensitive device; and
   confirming selection of an item by returning to said location of said manually applied pressure following a step of scrolling.

6. The method of claim 5, further comprising the step of:
   confirming selection of an item by providing a manually applied pressure at said location.

7. An apparatus for allowing a user to make a manual selection, comprising:
   a display device for displaying a list of items;
   a touch-sensitive device arranged to produce an output signal that changes by an extent related to an applied level of pressure; and
   a processing device configured to activate said list of items in response to said output signal, and provide a first list of items in response to scrolling in a first direction along a first scrolling axis, and a second list of items in response to scrolling along a second scrolling axis in a second direction;
   wherein said processing device is configured to reduce the speed of scrolling in said first direction in response to scrolling in a third direction, said third direction being substantially opposite to said first direction along said first scrolling axis; and
   further configured to increase the number of items in said list of items in response to an increase in said manually applied pressure.

8. The apparatus of claim 7, wherein said touch-sensitive device comprises a force sensing device comprising a quantum tunneling material.

9. The apparatus of claim 7, wherein said touch-sensitive device is configured to provide positional properties identifying the location of a pressure input in response to said applied level of pressure.

10. An electronic device comprising the apparatus of claim 7.

* * * * *